United States Patent

Koschig

[11] Patent Number: 5,562,198
[45] Date of Patent: Oct. 8, 1996

[54] HOLLOW BOLT LINK CHAIN

[75] Inventor: Richard Koschig, Freising, Germany

[73] Assignee: Joh. Winklhofer & Sohne GmbH & Co. KG, Munich, Germany

[21] Appl. No.: 337,687

[22] Filed: Nov. 10, 1994

[30] Foreign Application Priority Data

Nov. 10, 1993 [DE] Germany .......................... 9317226 U

[51] Int. Cl.⁶ ............................................ B65G 17/42
[52] U.S. Cl. ................... 198/803.01; 198/803.12
[58] Field of Search ................ 198/803.01, 803.12, 198/487.1

[56] References Cited

U.S. PATENT DOCUMENTS

| | | | |
|---|---|---|---|
| 1,243,098 | 10/1917 | Potthoff | 198/803.12 X |
| 2,951,578 | 9/1960 | Hibbard | 198/803.01 X |
| 3,889,800 | 6/1975 | Frische | 198/803.01 X |
| 4,388,990 | 6/1983 | Michalik | 198/803.01 |
| 4,518,077 | 5/1985 | Ronco et al. | 198/731 |
| 4,678,425 | 7/1987 | Gibbemeyer | 198/803.12 X |
| 4,836,359 | 6/1989 | Walter | 198/803.01 |
| 4,880,108 | 11/1989 | Burk | 198/803.12 |
| 4,890,726 | 1/1990 | Wissmann | 198/803.12 |
| 4,927,002 | 5/1990 | Springman | 198/487.1 |
| 4,930,620 | 6/1990 | Springman | 198/803.01 |
| 4,950,398 | 8/1990 | Wiegand et al. | 210/232 |
| 5,174,438 | 12/1992 | Witham et al. | 198/851 |
| 5,232,083 | 8/1993 | Motominami et al. | 198/803.12 |

FOREIGN PATENT DOCUMENTS

| | | | |
|---|---|---|---|
| 2554797 | 5/1985 | France . | |
| 2603260 | 3/1988 | France . | |
| 2234115 | 1/1971 | Germany | 198/803.12 |
| 7130659 | 8/1971 | Germany . | |
| 1781377 | 5/1972 | Germany . | |
| 7610413 | 8/1976 | Germany . | |
| 2613118 | 10/1977 | Germany . | |
| 2714273 | 2/1978 | Germany . | |
| 7737243 | 3/1978 | Germany . | |
| 2814956 | 10/1978 | Germany . | |
| 8802417.2 | 4/1988 | Germany . | |

*Primary Examiner*—David A. Bucci
*Attorney, Agent, or Firm*—Seed & Berry LLP

[57] ABSTRACT

In a hollow bolt link chain of a conveyor device, in which at least one adapter is provided for affixing a carrier of the chain, which is detachably secured in a hollow bolt with an adapter foot, the adapter foot comprises at its insertion end at least one locking element adjustable in elastically resetting fashion between a holding position and a pull-out position, which engages behind a counter-catch at the hollow bolt at least in positive locking fashion in the holding position. At least one locking element adjustable in elastically resetting fashion from a holding position spread away from the longitudinal axis of the adapter foot in the direction towards the longitudinal axis is disposed at the insertion end of the adapter foot in an adapter for the detachable fastening of a carrier to a hollow bolt link chain of a conveyor device.

15 Claims, 1 Drawing Sheet

5,562,198

HOLLOW BOLT LINK CHAIN

TECHNICAL FIELD

The invention relates to a hollow bolt link chain and to an adapter for affixing a carrier to such a chain.

BACKGROUND OF THE INVENTION

In a link chain according to DE-U 77 37 243 the adapter foot is secured in the hollow bolt by means of a safety cap provided with claws, which is slipped onto the projecting insertion end of the adapter foot. The safety cap is an element which can be manufactured and made available separately, for whose disassembly a tool is required and which can no longer be used after having been disassembled.

The adapter foot forms a hinge bolt of the chain in a link chain known from DE-U 71 30 659. A split-pin is inserted into the projecting insertion end of the adapter foot for securing. This is an element which can be manufactured and made available separately in the assembly of the of the adapter.

In a hollow bolt link chain known from DE-A-22 34 115 the insertion end of the adapter foot projecting beyond the hollow bolt is expanded by means of cold forming. The assembly of the adapter is time-consuming and requires special tools. After its disassembly, the adapter foot can no longer be used or can only be used after subsequent processing.

In a hollow bolt link chain for a conveyor device known from DE-U 76 10 413 the adapter foot is formed at the carrier. The securing is effected by means of a claw ring in a circumferential groove in the insertion end. A compression sleeve is pressed onto the adapter foot at the opposite side as a counter-stop. The assembly is time-consuming. A special tool is used for disassembly. The claw ring can only be used once. The adapter is multi-partite.

It is known from DE-A 28 14 956 to construct the hinge bolts in extended fashion in a link chain for a conveyor device. The adapter is a sleeve, preferably a sleeve with a longitudinal slot, which is pressed onto the projecting end of the hinge bolt and into which the carrier is pressed. The assembly and disassembly is troublesome. The frictional mounting of the sleeve involves the risk of an uncontrolled loosening or falling off of the sleeve. The additional expenditure during the manufacturing of the chain with the extended hinge bolt is great.

In a conveyor chain made of plastic components, which is known from U.S. Pat. No. 4,950,398 the adapter is fixed by means of two pins inserted into the hollow bolts and secured by means of split-pins inserted from the outside. The hollow bolts are fixed in the chain by means of a locking which is possible due to the deformability of the plastic material. A locking ring is formed at the inside of a bore of a formed sleeve of an exterior bracket, which locks in a locking groove at the outside at the end of the hollow bolt.

The adapter foot is a journal in a hollow bolt link chain known from U.S. Pat. No. 4,518,077, which is passed through the hollow bolt and is locked with a front end having a locking groove in a locking recess of the side plate of the opposite adapter. Two sides plates at both sides of the chain are always required, even if only one carrier must be attached to one side. Carriers are well known in the prior art, as is indicated in U.S. Pat. No. 4,518,077, which is incorporated herein by reference.

In a conveyor chain known from U.S. Pat. No. 4,927,002, which comprises carriers attached to one chain side, each adapter foot is a short hollow shaft end which is slipped onto the extended end of the pivot with a press fit. This securing of the adapter which is only frictional can get detached during operation of the conveyor chain. Carriers are well known in the prior art, as is further indicated in U.S. Pat. No. 4,927,002, which is incorporated herein by reference.

An adapter element known from DE-A-26 13 118 consists of a counterplate with two pins firmly affixed thereto, at whose ends circumferential grooves are formed. The pins are inserted through the hollow bolts from the side of the chain opposite to the carrier until they project at the other side. The adapter is slipped on with sleeves fitting onto the projecting pin ends and has a tongue projecting transversely downwards, which engages in the circumferential grooves.

In a chain known from DE-U-88 02 417 each carrier bolt is provided with an external thread with which it is screwed into an inner thread of the hollow bolt.

In a segmental belt consisting of interlocking segments, which is known from U.S. Pat. No. 5,174,438, each hinge bolt locks into recesses in link projections of the segments.

In a chain known from DE-C-17 81 377 a carrier means is affixed to the hinge bolt, which is riveted at both ends.

A connection element of two chains, which is known from DE-A-27 14 273, is slipped onto projecting pivots of the chain. The connection element is secured in its position by a transverse bar connecting both chains.

In a link chain known from FR-A-25 54 797 an adapter element is slipped from above with claws onto the sleeves of the chain and between the link plates.

In a chain known from FR-A-26 03 260 a support for carrier components is slipped onto the extended hinge bolts of the chain from above and locked positively. The support grips over the chain at both sides.

The invention is based on the object of providing a hollow bolt link chain of the type mentioned at the beginning and an adapter for affixing a carrier at such a link chain, in which as few elements as possible are used for the pull-out protection of the adapter foot, in which the adapter foot can be re-used and optionally relocated and in which no special tool is required for assembly and disassembly.

SUMMARY OF THE INVENTION

In the inventive design the adapter foot itself has the components required for the pull-out protection so that no elements which must be additionally manufactured or made available are used. The locking element is automatically brought into the holding position by means of the elastic resetting force, in which the adapter foot is positively secured against being pulled out. The assembly and disassembly of the adapter foot can be carried out easily and quickly, namely without the use of a special tool. The adapter foot can be quickly relocated and can be used an optional number of times.

In a constructionally simple and expedient embodiment the adapter foot can be inserted through the hollow bolt with the locking dog. Then the outwardly pointing locking dog locks the adapter foot against its being pulled out. On the one hand, the locking tongue can then be easily deformed elastically and, on the other, it secures the engagement of the locking dog.

A short construction of the adapter foot results in an embodiment in which the nose is disposed on a free end of the locking tongue. However, it is also conceivable to extend the free end of the locking tongue beyond the locking nose for the easier adjustment of the locking dog.

A firm seat of the adapter foot results from an embodiment having a stop surface engaging the hollow bolt. The adapter foot can no longer be pulled out of the hollow bolt due to the stop surface being approximately transversely to the longitudinal axis even in the case of a great action of force as long as the locking tongue is not intentionally adjusted.

An embodiment having a ramped surface engaging the hollow bolt is alternatively expedient. Here the ramp is used for adjusting the locking dog in such fashion by means of a corresponding pull on the adapter foot that the adapter foot can be pulled out. The force with which the locking dog is adjusted under the action of the ramp is suitably selected that great that the adapter is not automatically pulled out during operation.

An embodiment having an insertion bevel facilitates the insertion of the adapter foot into the hollow bolt, because the locking dog adjusts itself automatically as soon as a sufficient pressure is exerted in the insertion direction.

A good positive locking and only a few projecting parts are given in an embodiment in which the thickness of the nose corresponds approximately to the wall thickness of the hollow bolt.

An embodiment with several locking elements provides effective pull-out protection. The several locking elements may be designed relatively delicately since they support each other.

In an embodiment in which the adapter has receiver for affixing the carrier to the adapter. The carrier is fixed in the receiver, e.g. glued into or screwed into the receiver or secured by a transverse element.

The construction of the adapter or the adapter foot of plastic or light metal, leads to an especially light weight. This an important viewpoint in view of the often large number of carriers or adapters affixed to a link chain.

In another embodiment the locking element is an integral element of the adapter foot. The adapter can be moulded easily, in particular if it consists of reinforced plastic, light metal or an alloy. Reinforced plastic material makes a high strength with extremely low weight possible. However, the adapter could also be an moulded part of light metal or a specifically light alloy.

BRIEF DESCRIPTION OF THE DRAWINGS

The embodiments of the invention are explained by means of the drawing.

Figure 1:
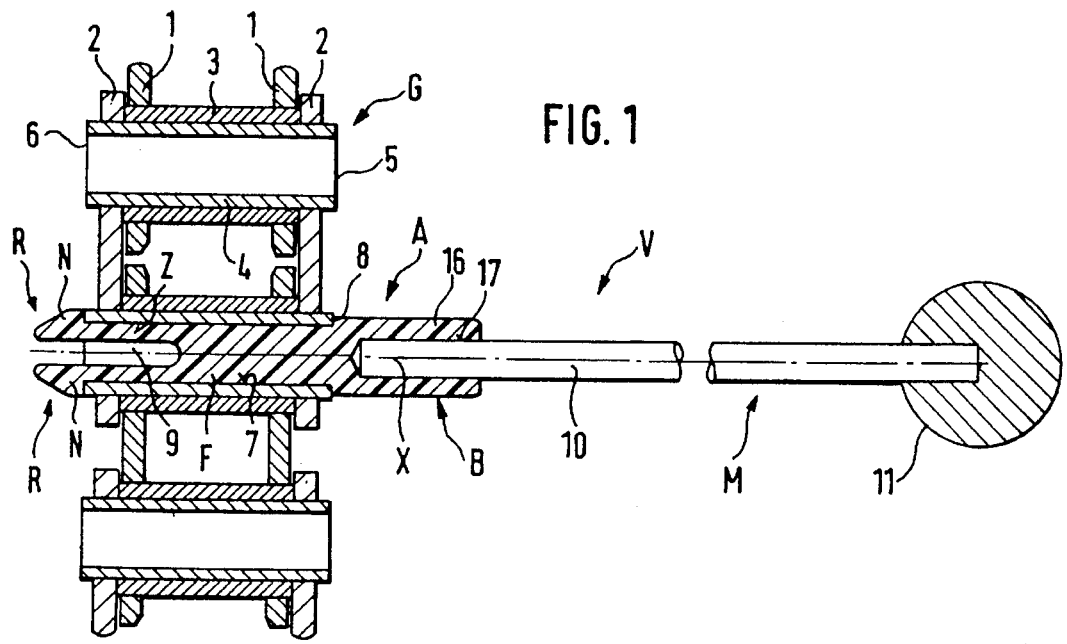
FIG. 1 shows a sectional view of a hollow bolt link chain with a carrier.

Carriers M are affixed at predetermined distances at a hollow bolt link chain G for a conveyor means V, e.g. a conveyor means for can or tube blanks through a enamelling and heating station, one of which is shown in FIG. 1. Each carrier M is fixed in a joint of the link chain G by means of an adapter A which can be mounted and dismounted without a special tool.

DETAILED DESCRIPTION OF THE INVENTION

The link chain G consists of inner link plates 1 disposed in pairs in spaced relationship, outer link plates disposed in pairs, respectively one sleeve 3 connecting the inner link plates and respectively one hollow bolt 4 traversing the sleeve 3 and fixed in the outer link plates 2. A roller (not shown) may be mounted on the sleeve 3. The front ends of each hollow bolt 4 are designated with 5 and 6.

The adapter A is inserted into the respective hollow bolt 4 with an adapter foot F so that it is secured against being pulled out. At least one formed locking element R is provided for the pull-out protection of the adapter foot F, which is adjustable in elastically resetting fashion between the holding position shown in FIG. 1, in which it is locked with the front end 6 of the hollow bolt 4, and a pull-out position (not shown) by means of pressure on the locking element in the direction towards the longitudinal axis of the adapter foot, which is designated with X, so that the adapter foot can be inserted, on the one hand, and pulled out again, on the other.

Figure 2:
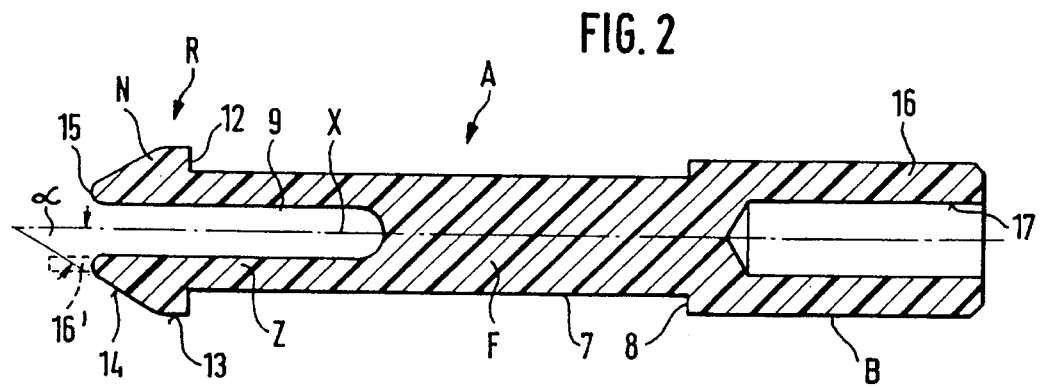
FIG. 2 shows the longitudinal view of an adapter as it is used in FIG. 1.

The adapter foot has a pin-like base body 7 which fits into the hollow bolt 4 with a predetermined fit. An abutment shoulder is shaped on the adapter foot F spaced from the locking element R, which serves for position-securing at the other front end 5 of the hollow bolt 4. Two locking elements R are represented in FIG. 2, each of which consisting of a resilient locking tongue 2 and a locking dog N pointing outwardly therefrom. The locking tongues Z are separated from each other by a slot 9 in the adapter foot F, which is open towards the insertion end and can be inserted into the adapter foot F in axial direction to such an extent that the locking elements R can be adjusted without problems and move back into the represented holding position with sufficient resetting force.

A receiver B for the carrier M is provided at the end opposite to the insertion end, which is a pin 10 with an end cap 11 in the shown embodiment. The pin is secured in a receiving bore 17 of the receiver B designed as a formed sleeve 16, e.g. by means of gluing. It is conceivable to design the adapter A directly integrally with the carrier M.

It can be recognized in the enlarged sectional view according to FIG. 2 that the adapter A has a stop surface not facing the free end 15 and extending approximately vertically to the longitudinal axis X at the locking nose N of each locking element R, which engages behind the front end 6 of the hollow bolt 4, which serves as a counter-catch. The height of the stop surface 12, seen in radial direction, corresponds e.g. approximately to the radial wall thickness of the hollow bolt 4. Following the stop surface 12 a plane, preferably cylindrical surface 13 is provided at the outside on the locking nose N, from which a plane or conical insertion bevel 14 extends to the free end 15.

The inclination angle of the insertion bevel 14 is e.g. 25° (angle α). It is outlined at 16 that the free end of the locking tongues can be extended beyond the locking nose in order to have a better engagment for adjusting the locking elements. The slot 9 is so wide that it makes a pressing together of the surfaces 13 up to the outer diameter of the bolt 7 possible.

Figure 3:
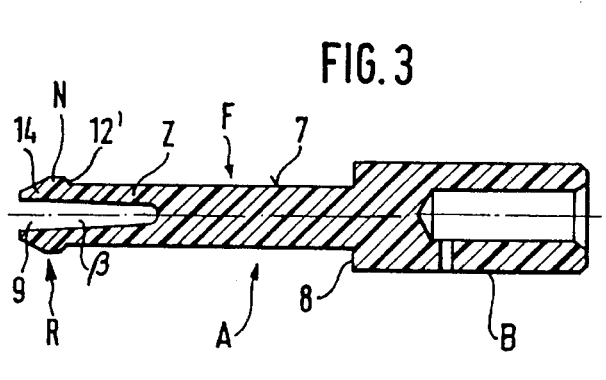
FIG. 3 shows a longitudinal view of a modified embodiment of an adapter.
Figure 4:
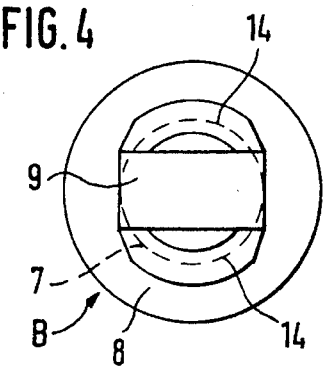
FIG. 4 shows a front view of the adapter of FIG. 3.

Modifying the embodiment of FIGS. 1 and 2 an oblique ramp 12' is provided on the locking nose N in the embodiment of FIGS. 3 and 4 instead of the stop surface located transversely to the longitudinal axis X, which tapers in the pull-out direction towards the bolt 7, e.g. with an inclination angle β of approx. 45°.

It would be sufficient to provide only one locking element. However, suitably two or even more locking elements R separated in circumferential direction with interspaces are provided. The adapter A or at least the adapter foot F consists of a plastic material, e.g. of reinforced plastic material or of light metal, in order to make the adapter more light-weight. However, it is also conceivable to construct the adapter A or the adapter foot F of conventional metal, steel or the like.

For the assembly of the adapter A, it is placed with the locking elements R onto the front end 5 of the hollow bolt 4. The insertion end can be pushed through the hollow bolt 4 by means of the compression of the locking elements or only under the action of the insertion bevels 14 until the insertion end finally projects beyond the front end 6. Then the locking elements R jump outwardly into the holding position shown in FIG. 1, in which the adapter foot abutting with the abutment shoulder 8 at the front end 5 is secured against being pulled out. For disassembly, the locking elements R are compressed in the direction towards the longitudinal axis so that the adapter foot F can be pulled out. The pulling out is facilitated in the embodiment according to FIG. 3. If required, the locking elements R are pressed together alone by the tensile force exerted for the pulling out via the ramps 12' so that the assembly and disassembly can be carried out completely without a tool or without engagement at the locking elements. This is e.g. suitable in a link chain which is installed in such fashion that its face not facing the carriers is not accessible or only accessible with difficulties.

The advantageous features of the above-mentioned embodiments are:

A carrier system which can be universally combined for conventional hollow bolt link chains of various designs.

Optionally mountable and exchangeable adapters made of plastic material or other, light-weight alternative materials, the adapters being capable of being assembled and/or disassembled without special tools.

Thus various conveying combinations for different products and tools can be implemented in the link chain without great expenditure.

The combination of the hollow bolt link chain with plastic or light-metal elements leads to a considerable weight reduction of the system. The adapter with the carriers or without the carriers can also be relocated quickly and optionally and affixed by unskilled persons, a very effective pull-out protection being achieved in each case. The locking of the locking elements is clearly noticeable and/or audible so that no special care must be taken during assembly. The positive locking of the locking element(s) secures the adapter very reliably against being pulled out of the hollow bolt.

I claim:

1. A hollow bolt link chain, comprising at least one adapter for detachably affixing a carrier to the link chain, the adapter having an adapter foot which is extractably insertable into a hollow bolt of the link chain, the adapter foot having at least one locking element which detachably secures the adapter foot against being pulled out of the hollow bolt by engaging a counter-catch on the hollow bolt in a holding position, the locking element being adjustable in elastically resetting fashion between the holding position and a pull-out position in which the adapter foot is extractable from the hollow bolt.

2. A hollow bolt link chain according to claim 1, wherein the locking element comprises a locking tongue with an outwardly pointing nose.

3. A hollow bolt link chain according to claim 2, wherein the nose is disposed on a free end of the locking tongue.

4. A hollow bolt link chain according to claim 2, wherein the nose has a stop surface located approximately transversely to a longitudinal axis of the adapter foot and facing the counter-catch so it engages the counter-catch in the holding position.

5. A hollow bolt link chain according to claim 2, wherein the nose has a ramped surface with an inclination angle of approximately 45° which is inclined away from the counter-catch and which engages the counter-catch in the holding position.

6. A hollow bolt link chain according to claim 2, wherein the nose has an insertion bevel a free end with an inclination angle of about 25° with respect to a longitudinal axis of the adapter foot.

7. A hollow bolt link chain according to claim 2, wherein a thickness of the nose corresponds approximately to a wall thickness of the hollow bolt and wherein an end surface of the hollow bolt lying in a plane approximately transverse to a longitudinal axis of the hollow bolt forms the counter-catch.

8. A hollow bolt link chain according to claim 1, wherein at least two locking elements disposed in distributed fashion with interspaces are provided in a circumferential direction about a longitudinal axis of the adapter foot.

9. A hollow bolt link chain according to claim 8, wherein each locking element comprises a locking tongue with an outwardly pointing nose, the locking tongues being separated by a longitudinal slot in the adapter foot which is open towards free ends of the locking tongues, wherein the width of each locking tongue corresponds approximately to twice the height with which each nose can be adjusted from the holding position into the pull-out position.

10. A hollow bolt link chain according to claim 1, wherein the adapter foot has an abutment shoulder at a distance from the locking element along the adapter foot which corresponds approximately to the length of the hollow bolt.

11. A hollow bolt link chain according to claim 1, wherein the adapter has a receiver at an end opposing the locking element for fixing the carrier to the adapter.

12. A hollow bolt link chain according to claim 1, wherein the adapter and/or the adapter foot consists of plastic material, light metal or metal.

13. An adapter for detachably affixing a carrier to a hollow bolt in a hollow bolt link chain the adapter comprising an adapter foot extractably insertable into the hollow bolt the adapter foot having at least one locking element which detachably secures the adapter foot against being pulled out of the hollow bolt by engaging a counter-catch on the hollow bolt in a holding position, the locking element being adjustable in elastically resetting fashion between the holding position and a pull-out position in which the adapter foot is extractable from the hollow bolt.

14. An adapter according to claim 13, wherein the locking element is disposed integrally on the adapter foot.

15. An adapter according to claim 13, wherein the adapter consists of plastic material, light metal, metal or an alloy.

* * * * *

UNITED STATES PATENT AND TRADEMARK OFFICE
CERTIFICATE OF CORRECTION

PATENT NO.    :   5,562,198
DATED         :   October 8, 1996
INVENTOR(S)   :   Richard Koschig It is certified that error appears in the above identified patent and that said Letters Patent is hereby corrected as shown below:

In column 5, claim 1, line 49, please delete ",".

In column 6, claim 6, line 15, following "bevel" please insert --at--.

In column 6, claim 13, line 48, immediately following "chain" please insert --,--.

In column 6, claim 13, line 49, immediately following "bolt" please insert --,--.

Signed and Sealed this

Twenty-fifth Day of February, 1997

BRUCE LEHMAN

*Attest:*

*Attesting Officer*  *Commissioner of Patents and Trademarks*